Oct. 14, 1958     C. A. LARSON     2,856,056
TRIMMER GATE

Filed Aug. 1, 1955     2 Sheets-Sheet 1

INVENTOR.
CARL A. LARSON
BY *H. F. Woodward*
atty

United States Patent Office 2,856,056
Patented Oct. 14, 1958

2,856,056

TRIMMER GATE

Carl Arthur Larson, International Falls, Minn., assignor to Minnesota and Ontario Paper Company, Minneapolis, Minn.

Application August 1, 1955, Serial No. 525,499

2 Claims. (Cl. 198—23)

The present invention relates to apparatus for handling sheet material such as, for example, fiber composition board.

The nature of the invention may be readily understood by reference to the illustrative apparatus employing the invention shown in the accompanying drawings.

Figure 1:
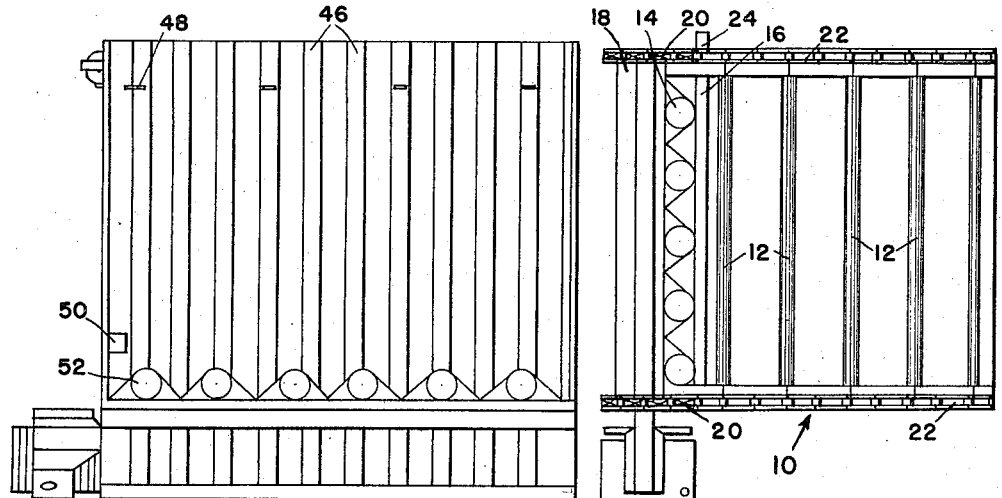
Figure 1 is a top plan view of the sheet handling apparatus.
Figure 2:
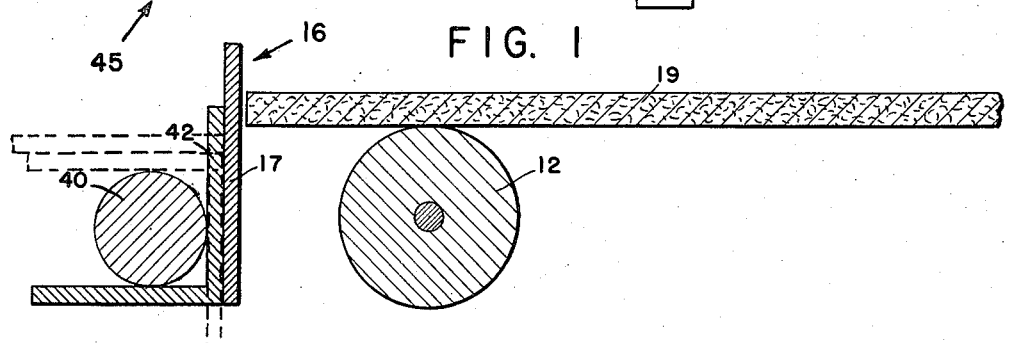
Figure 2 is a sectional view, with parts broken away, of the automatic gate for controlling the flow of the sheet material.
Figure 3:
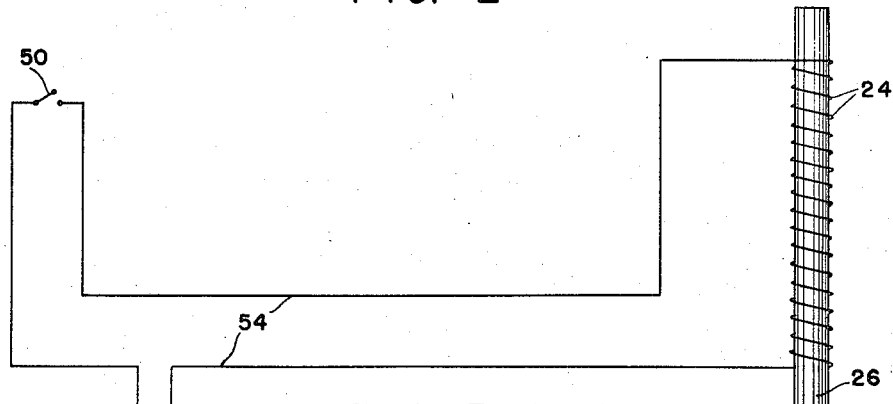
Figure 3 is a diagrammatic view of a circuit that may be used in connection with control of the automatic gate.
Figure 4:
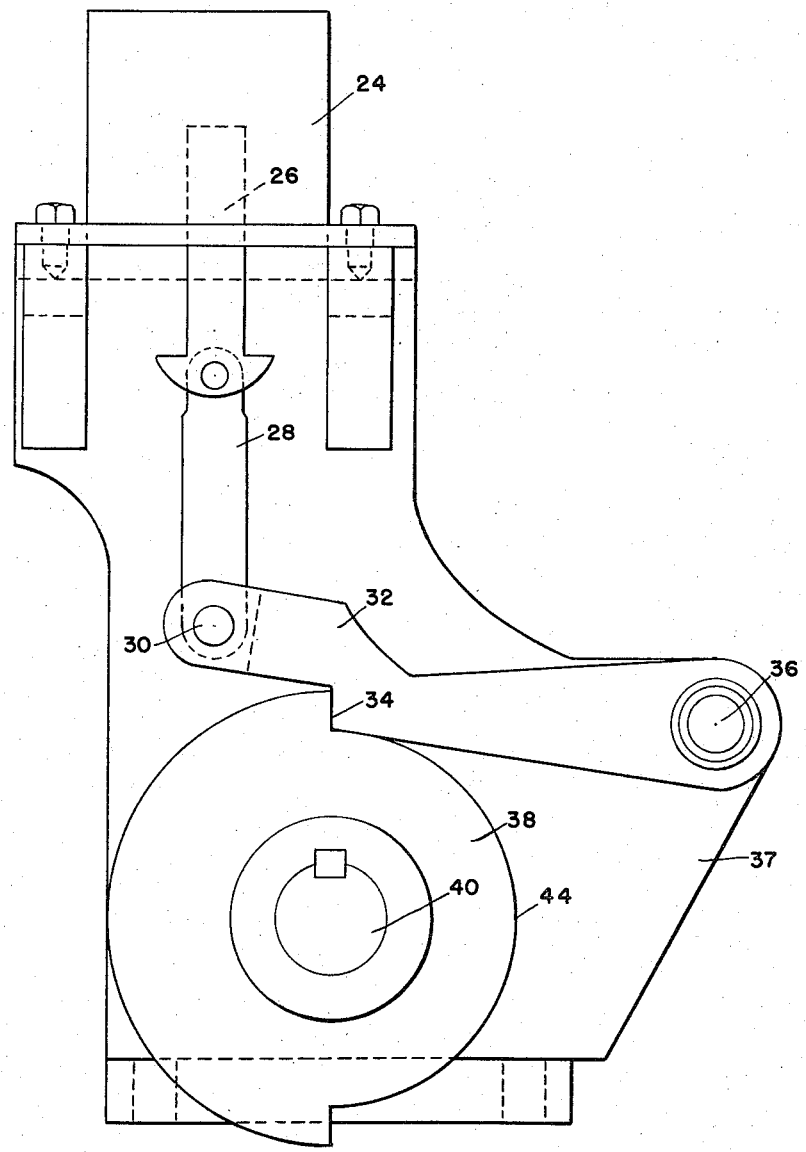
Figure 4 is an enlarged end view of the automatic gate control means.

Fiber composition board is usually produced in a continuous web or sheet by a machine adapted for that purpose. One such appartus is disclosed in Patent No. 1,672,249. The fiber composition board after being formed is divided into master sheets and passed through a suitable drier and after the sheets are dried they are trimmed and divided into the desired size. The master sheets coming from the drier are transferred to a conveyor shown generally at 10. This conveyor includes driven rolls 12, trimming and dividing means or other work performing means 14 and driven rolls 18. To control the movement of the sheets on the conveyor 10, an automatic gate 16 is provided. The rolls may be driven by suitable means, for example, rolls 18 may be driven which in turn drive rolls 12 through drive means 20 and 22. The conveyor 10 may be of the type shown in Patent No. 2,031,385. The conveyor also could be of the type disclosed in Patent No. 2,666,259.

The gate 16 is located in the conveyor 10 adjacent one end. The gate includes stop bar member 17 which is secured to an L-shaped member 42 and a shaft 40 which is attached to member 42. The stop bar 17 normally extends in a vertical position into the path of travel of the fiberboard 19 carried by the conveyor 10. The bar 17 is of sufficient width to bridge the space between rolls of the conveyor when the fiberboard is being discharged from the conveyor 10. The shaft 40 and L-shaped member 42 are of sufficient weight to promptly return the stop bar to the vertical position after the fiberboard passes thereover. Operatively mounted on the shaft 40 is lock stop member 38 which is provided with cut-away portion 44 which provides locking shoulder 34. The shaft 40 is journaled in suitable bearing attached to the conveyor support. This shaft 40 is free to move in its bearing a portion of a complete rotation when the lock for the stop gate is released. The driven board causes the vertical portion of the gate to move to a horizontal position and after the board has passed over the stop gate the weight of such gate returns it to the initial position.

The conveyor 45 may be of any suitable type but preferably of the endless type which may be chains or the like. The conveyor 45 is adapted to carry the fiberboard in a direction substantially at right angles to the direction of the board carried by the conveyor 10. Mounted on the conveyor 45 are lugs 48 which contact the fiberboard to move it along the conveyor. One of the lugs 48 is adapted to close the switch 50 which results in the solenoid 24 being energized and raising the lever 32 so that the gate may release the board carried by the conveyor 10. The gate is so arranged that the fiberboard from conveyor 10 is not discharged to conveyor 45 until such board has almost been discharged through the cutting and trimming device or other work performing means.

For unlocking the gate, solenoid 24 is provided and the core or arm 26 of thte solenoid is connected to link 28. This link is hingedly connected to lever arm 32 at 30. The lever arm 32 is pivotally mounted on frame 37 at 36. This pivotally mounted arm is provided with a shoulder which cooperates with a shoulder 34 of the member 44 and locking the gate in the upright position.

In operation the fiberboard is delivered to the conveyor 10. The first sheet passing through the cutting means 14 which trims and divides the sheet into the desired size in one direction the sheet is then delivered to conveyor 45 which conveys the fiberboard to the cutting means 52. After the first board is delivered from the conveyor 10 to conveyor 45, the gate 16 holds and prevents any additional sheets from being fed to the conveyor 45 until one of the lugs carrying the sheet upon the conveyor 45 closes the switch 50. The use of the gate in combination with conveyors insures that no congestion will occur on the cutting means or on the conveyors by one sheet being transferred to the second conveyor while the sheet thereon is being discharged through the cutting means.

What is claimed:

1. An apparatus for handling fiberboard comprising a first conveyor, a substantially L-shaped stop gate positioned in said first conveyor adjacent one end, said stop gate normally urged in a vertical position, a shaft supporting said stop gate, said stop gate having one arm of the L-shaped member heavier than the other arm, a stop lock member positioned on the said shaft, a latch lever arm operatively connected to said stop gate and to a solenoid core, a solenoid mounted on said first conveyer, a core mounted in said solenoid, a second conveyor adjacent the first conveyor and adapted for moving fiberboard at substantially right angles to the movement of fiberboard on said first conveyor, means on the second conveyor for actuating the solenoid core and thereby releasing the stop gate to permit movement osf fiberboard from the firt conveyor and across the second conveyor.

2. An apparatus for handling fiberboard comprising a first conveyor, a stop gate positioned in the first conveyor adjacent one end, said stop gate mounted on a shaft carried by the said first conveyor and consisting of a substantially L-shaped member, a stop bar secured to one side of the L-shaped member, said stop bar normally extending in a vertical position, a stop lock member mounted on said shaft, a latch lever arm operatively mounted on the stop lock member, said latch lever arm attached adjacent one end to a solenoid core, a solenoid mounted on said first conveyor, a solenoid core in said solenoid, a second conveyor for moving fiberboard at substantially right angles to the movement of fiberboard on said first conveyor, and means on the said second conveyor for actuating the solenoid core thereby to release the stop gate to permit fiberboard to move from the first said conveyor to the second said conveyor.

References Cited in the file of this patent

UNITED STATES PATENTS

| | | |
|---|---|---|
| 1,619,070 | Golding | Mar. 1, 1927 |
| 2,312,340 | Kilpatrick | Mar. 2, 1943 |
| 2,576,369 | Sticelber | Nov. 27, 1951 |
| 2,662,630 | Freholm | Dec. 15, 1953 |